United States Patent [19]

Rice

[11] 4,180,384
[45] Dec. 25, 1979

[54] CATALYTIC FUEL COMBUSTION APPARATUS AND METHOD

[75] Inventor: Richard E. Rice, Arlington, Mass.

[73] Assignee: Comstock & Wescott, Inc., Cambridge, Mass.

[21] Appl. No.: 832,109

[22] Filed: Sep. 12, 1977

Related U.S. Application Data

[63] Continuation-in-part of Ser. No. 561,591, Mar. 24, 1975, abandoned.

[51] Int. Cl.$^2$ .............................................. C10L 1/00
[52] U.S. Cl. ........................................................ 44/52
[58] Field of Search ............................................ 44/52

[56] References Cited

U.S. PATENT DOCUMENTS

| | | | |
|---|---|---|---|
| 1,990,499 | 2/1935 | Odell | 44/52 |
| 2,948,595 | 8/1960 | Orr | 44/52 |
| 3,194,449 | 7/1965 | Kaiser, Jr. | 44/52 |
| 3,697,240 | 10/1972 | Hori et al. | 44/52 |

*Primary Examiner*—Winston A. Douglas
*Assistant Examiner*—Y. Harris-Smith
*Attorney, Agent, or Firm*—James H. Grover

[57] ABSTRACT

A flameless catalytic combustion apparatus includes a combustion chamber with a hydrogenous fuel inlet and a mass of catalyst in the chamber between the inlet and an outlet. Preferably the catalyst mass comprises porous pellet bodies supporting varying high and low concentrations of platinum family metals dispersed therein. For spontaneous starting of combustion the fuel is one of the lower alcohols and the high catalyst concentration is at the fuel inlet. The fuel may be in a container pressurized by air, or a lower ether or lower hydrocarbon which is also a fuel. Preferably separate, valved conduits from the fuel container first supply either atomized fuel droplets or air and fuel vapor to the high catalyst concentration for spontaneous ignition of combustion and vaporized fuel for continued combustion throughout the catalyst mass. The catalytic combustion apparatus may include a heat exchanger for fluids such as air, water or personal care foams and creams, or may be used in heating and cooking apparatus.

12 Claims, 7 Drawing Figures

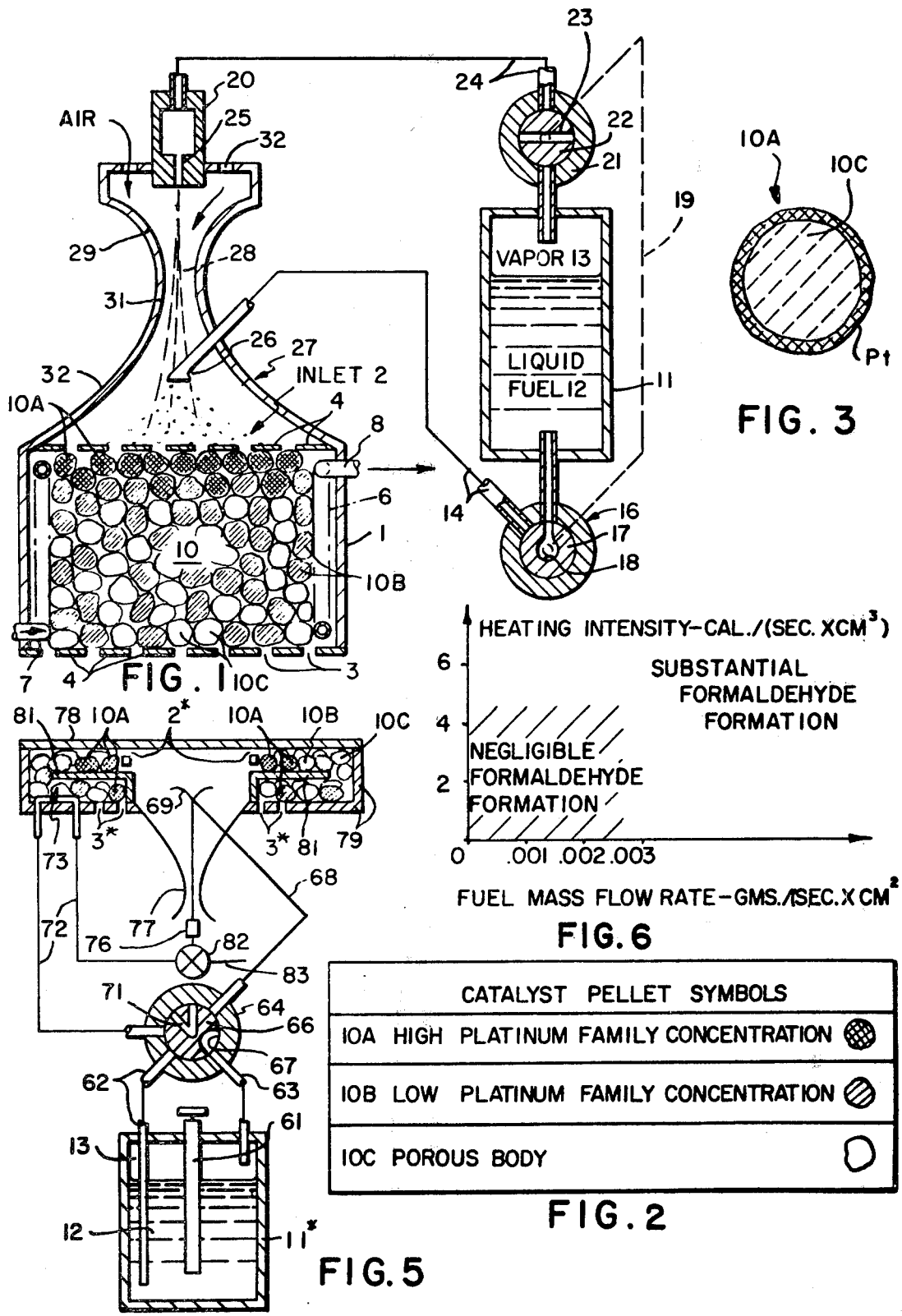

CATALYTIC FUEL COMBUSTION APPARATUS AND METHOD

RELATED APPLICATION

This application is a continuation-in-part of my co-pending application of the same title, Ser. No. 561,591, filed Mar. 24, 1975, now abandoned.

BACKGROUND OF THE INVENTION

The present invention relates to heating systems in which a mixture of a fuel vapor and air are burned flamelessly on the surface of a catalyst. The invention relates particularly to the rapid and efficient starting of the combustion of the fuel when both the fuel and the catalyst are initially cold; i.e., at a temperature near room temperature or lower.

The catalytic oxidation of hydrocarbons, alcohols, and other chemicals at elevated temperatures has been practiced efficiently for many years in industrial processes, and more recently in such applications as small space heaters fueled by propane. A characteristic of such applications is that they operate steadily for relatively long periods, and are started from an initially cold state only infrequently. Thus, the catalytic space heater can be ignited with a match, and large industrial catalytic systems can be brought slowly up to operating temperature by auxiliary heaters. Such systems would be more conveniently started by a self igniting catalyst.

For certain applications which might be most advantageously served by catalytic heaters, however, the heating periods are very short and the system must be heated frequently from a cold start; hence very rapid and efficient initiation of combustion is mandatory, and an auxiliary heating system for starting combustion is unacceptable. One such application is the heating of shave foam or cosmetics dispensed from an aerosol can, where a few grams of material must be heated about 50° F. to 80° F. in a period of 10 to 20 seconds, or less. In this case the heating system must be small and inexpensive, but capable of developing high heating intensities very quickly, and also capable of completely burning the fuel without production of noxious combustion products. It is also imperative that the system be highly efficient in converting and transferring the heating value of the fuel into the fluid which is to be heated.

Experience has shown, however, that suitable fuels, such as hydrocarbons and alcohols, when vaporized and mixed with air, will not start to burn spontaneously when brought into contact with catalysts of the types commonly used, unless the catalyst or the fuel, or both are preheated.

A further difficulty encountered in the use of conventional catalyst results from the fact that the catalytically active metal, for example platinum black, is most effective when supported upon highly porous base materials such as gamma alumina or silica gel, which are highly hygroscopic. Thus, between heating periods when the system is cool, the catalyst support material adsorbs moisture from the ambient air which greatly reduces the activity of the catalyst. This will completely block the spontaneous oxidation of preferred fuels such as methanol on the surface of the catalyst when both catalyst and fuel are initially cold.

It is also highly desirable that catalytic heating systems for applications such as those mentioned above use a fuel whose vapor pressure is higher than atmospheric so that a high velocity jet of fuel vapor can be used to aspirate the air required for combustion, thus avoiding the need for pumps or other pressurizing devices. Thus, pure methanol, one of the most easily catalytically oxidized fuels cannot be used without some pressure generating device. Hydrogen, another fuel which is readily oxidized catalytically, is not as practical in these applications because of the difficulties and cost of storing and handling this gas under high pressure.

Accordingly, objects of the present invention are to provide apparatus and a method for rapid, spontaneous ignition of catalytic combustion with a liquid fuel, preferably an alcohol, which is effective at low temperature relative to operating temperature and in the presence of moisture in the catalyst mass.

A further object is to provide catalytic combustion with high efficiency of fuel utilization and without production of noxious combustion products.

STATEMENT OF THE INVENTION

According to one aspect of the invention catalytic fuel combustion apparatus comprises a combustion chamber forming a fuel inlet and an outlet and a combustion path there between, and a fuel- and air-permeable mass of catalyst in the chamber the mass including a relatively high catalytic concentration at the inlet and a relatively lower catalyzer concentration toward the outlet.

Further according to the invention the apparatus comprises a container of hydrogenous fuel connected by conduit means to the inlet to the combustion chamber. Preferably the container holds fuels in both liquid and vapor phases supplied to the chamber in both phases.

Still further according to the invention the fuel is supplied in one phase for spontaneous ignition and in the other phase for extended combustion.

DRAWINGS

FIG. 1 is a schematic showing fluid heating apparatus with catalyst pellets according to the invention;

FIG. 2 is a table of catalyst pellet symbols as used in the figures;

FIG. 3 is a cross-section of a highly concentrated catalyst pellet;

FIG. 5 is a schematic showing of a heating plate combustion system using air pressurized fuel;

FIG. 6 is a Heating Intensity versus a Fuel Mass Flow Rate Diagram; and

DESCRIPTION

Figure 4:
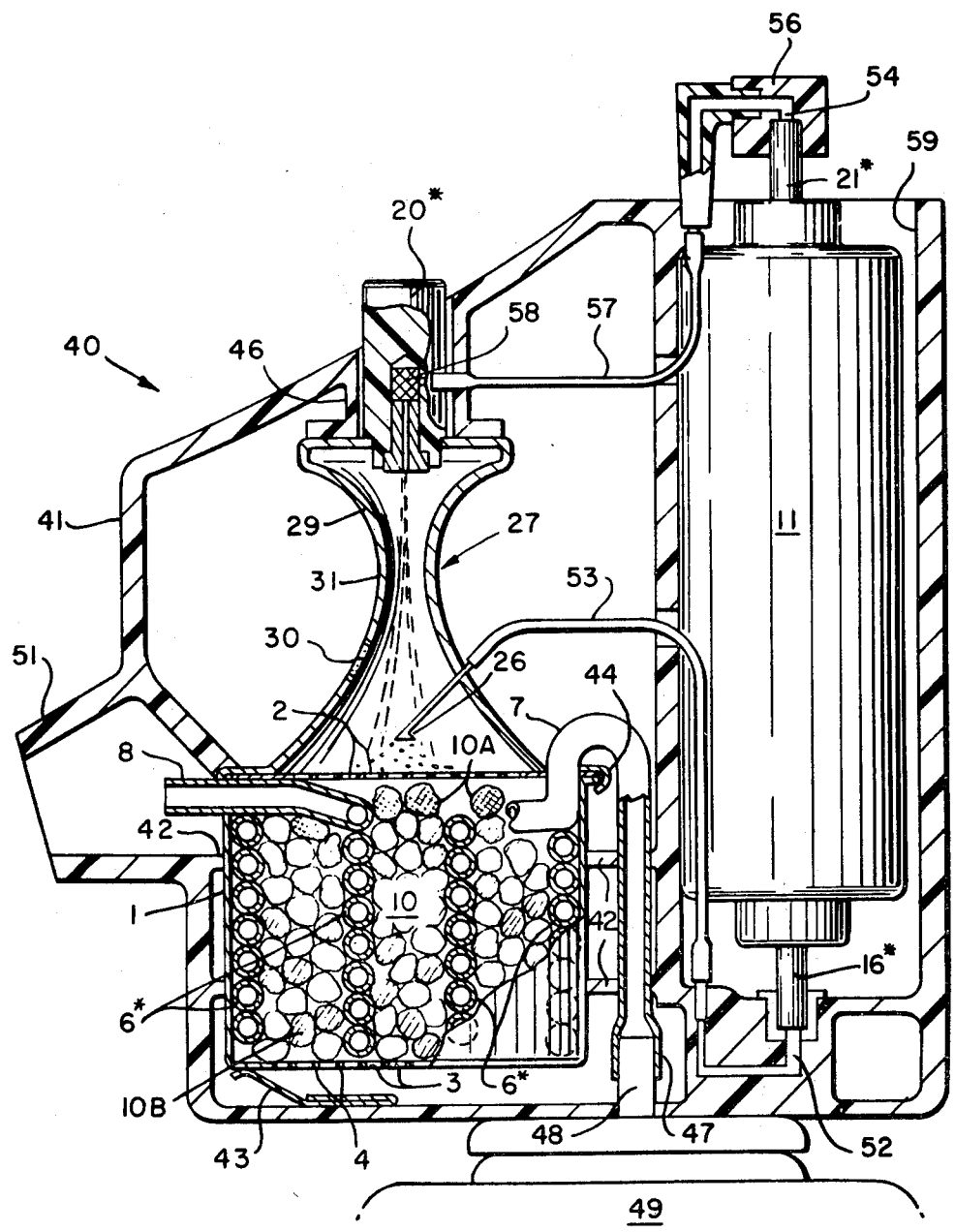
FIG. 4 is an elevation shown partly in section of apparatus for rapid heating of a personal care fluid.
Figure 7:
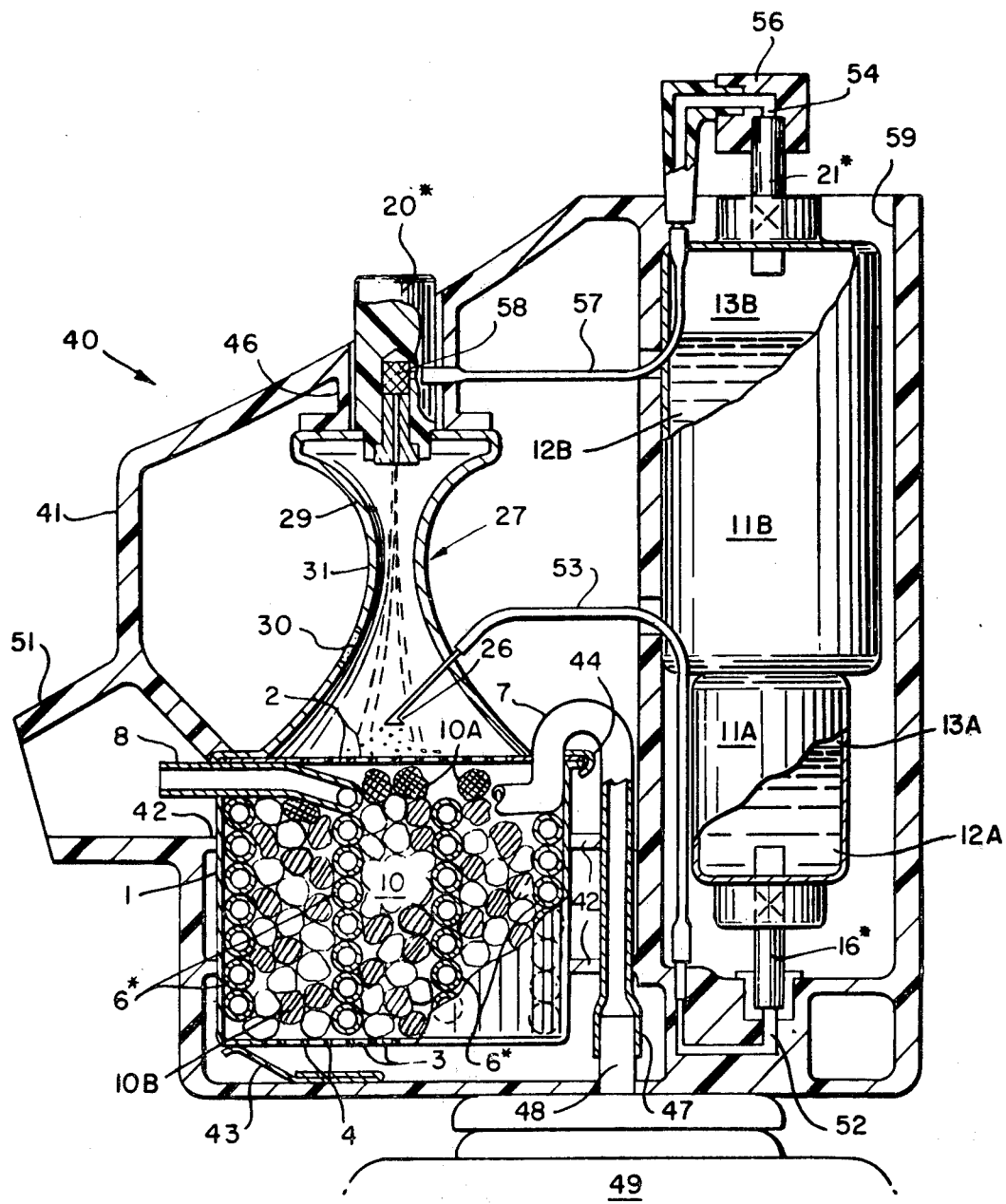
FIG. 7 is an elevation like FIG. 4 showing a modification thereof.

Two-Phase Fuel Combustion—FIG. 1
Fuels
Catalysts—FIGS. 2 and 3
Fuel Flow Rate—FIG. 6
Lather Heater—FIG. 4
Stove—FIG. 5
Multiple Fuel Containers—FIG. 7

Two-Phase Fuel Combustion—FIG. 1.

The catalytic combustion apparatus of FIG. 1 comprises a tubular metal casing 1 having an upper fuel inlet 2 and a lower combustion product outlet 3 covered by screens 4. Surrounding the combustion chamber within the casing 1 is a coil of metal tube 6 with an entrance 7 and exit 8 for a fluid to be heated. The remaining volume within the chamber is filled with a bed of catalyst pellets 10 of three types 10A, 10B, 10C as shown in FIGS. 2 and 3.

Fuel is supplied to the combustion chamber 1 from a pressurized container 11 holding a hydrogenous fuel in liquid phase volume 12 and vapor phase volume 13 as described more fully under the caption Fuels. Fuel from the liquid volume is fed to a conduit 14 through a metering valve 16 whose rotating plug 17 has a space for holding a predetermined amount of fuel which is released into the conduit upon 45° counter clockwise rotation of the plug from the position shown in FIG. 1. The metering valve plug 17 is coordinated with the plug 22 of a vapor valve 21 by a mechanical coupling 19. The vapor plug 22, upon 90° rotation from the position shown, connects the vapor volume 13 with a vapor conduit 24.

The liquid fuel conduit 14 leads to an atomizing nozzle 26 within an air aspirator 27, the nozzle spraying the metered amount of liquid fuel in fine droplets toward the fuel inlet 2 to the combustion chamber 1. Immediately inside the inlet is a mass of catalyst pellets 10A with a high concentration of catalyst in the platinum family described more fully hereinafter under the caption Catalysts. A hydrogenous fuel such as methanol will spontaneously ignite in flameless combustion on contact with a high platinum family concentration. Simultaneously with, or shortly after ignition fuel in vapor phase is supplied through conduit 24 to a nozzle 20 with an orifice 25 which meters the continuous flow of vapor and directs it in a jet 28 through the convergence 29, throat 31 and divergence 32 of the aspirator toward the fuel inlet 2 to the combustion chamber. The vapor jet entrains air and draws it through openings 32 adjacent the metering nozzle 20, mixing the fuel and air as they approach the combustion chamber so that flameless catalytic combustion is sustained by continued flow of the fuel in its vapor phase.

Heat from the combustion is exchanged with fluid flowing through the coil 6, which fluid may be a gas such as air or a liquid such as water, either of which can be circulated through radiators or other apparatus.

A catalytic heater of the type described above and having a double helical coil as shown in FIG. 4 was tested to determine its characteristics as a water heater. For this purpose, the inlet was connected to a water source which provided a constant water flow rate of 1.38 grams per second. The measured temperature rise of the water was 12.8° C. The total volume of the catalytic heater, i.e. the catalyst bed, was 8.05 cubic centimeters. The heating intensity of this system was thus 2.2 calories per second per cubic centimeter or in other units 890,000 BTU per hour, per cubic foot. The importance of this high heating intensity can be visualized in terms of a familiar application such as a house heater which might typically have a capacity of 150,000 BTU per hour. The catalytic heater described above scaled to a capacity of 150,000 BTU per hour would occupy a volume of only 0.169 cubic foot. Along with this remarkable heat intensity the heater operates with high efficiency and fuel economy, and low pollution in its combustion products.

Fuels

Of the many available fuels only four are known to ignite spontaneously and safely in the presence of a suitable catalyst at normal ambient temperature, that is 40° to 100° F. Other fuels such as formaldehyde, formic acid and hydrazine hydrate will oxidize spontaneously but are toxic, inconvenient and dangerous to handle. These safe spontaneously igniting fuels are hydrogen and the three lower alcohols, methanol, ethanol and isopropanol, methanol being preferred. While other hydrocarbons such as natural gas or the lower alkanes may be used as a primary fuel after ignition they will not start catalytic combustion spontaneously. Thus either in industrial processes using primary fuels after ignition or in intermittently started catalytic combustion apparatus using the starting fuel as an operating fuel also, the lower alcohols are useful.

Whereas primary fuels are delivered from a pressurized system, smaller apparatus run on the starting fuel requires fuel pressurization by air or a self pressurizing fuel. For catalytic combustion the lower ethers, dimethyl and methyl ethyl ether, and lower alkanes and alkenes have been found to be most suitable as a pressurizer when mixed with the lower alcohols. The mixture of methanol and dimethyl ether as a catalytic fuel is mentioned generally in U.S. Pat. No. 2,764,969 to Weiss. Such a fuel mixture has, however, been found to have a rather critical range of alcohol ether proportion, particularly in small fuel containers used in portable or compact self-igniting combustion units such as are described herein. While the ether is a fuel, the alcohol which is essential to start combustion has a substantially lower vapor pressure, so that as fuel is withdrawn from the vapor space of a fuel container the concentration of ether in the liquid phase drops resulting in a drop of vapor pressure. When the pressure is reduced to the point that the heating rate is below the useful limit a residue of unusable fuel remains in the container. When the pressure drops to atmospheric the liquid residue is substantially all alcohol. I have found that if the alcohol is in excess of 25% by volume of the initial alcohol-ether mixture an unusable residue of fuel in excess of 35% of the original fuel volume will result in substantial economic waste. On the other hand a proportion of approximately 5% alcohol by volume is required to insure spontaneous ignition. Within the range of 5% to 25% alcohol (e.g. methanol) to 95% to 75% ether (e.g. dimethyl ether) 10% alcohol and 90% ether is preferred.

Although the loss of pressure and waste of alcohol could be avoided by withdrawing fuel from the liquid volume 12 of the container 11, the liquid fuel would be evaporated in the aspirator 27 or in the mass 10 of catalyst pellets. Such fuel evaporation produces a refrigeration effect which will reduce or inhibit ignition or continued combustion. However, according to one aspect of the invention, metering only a small amount of alcohol-rich liquid fuel does not inhibit spontaneous ignition, and subsequently supplying fuel pre-evaporated in the fuel container 11 isolates the combustion chamber 27 from the refrigeration effect. The fuel container can absorb and dissipate the refrigeration remotely from the combustion chamber. Further the fuel container has sufficient mass and external heat transfer surface to prevent excessive chilling of the fuel therein.

While the alcohol-ether pressurizer mixture described above has been found to be a reliable starting and running fuel, particularly in a single fuel container delivering the fuel in liquid and vapor phase, several advantages have been found in the use of lower alkane, alkene and cyclo hydrocarbons with less than five carbon atoms as a pressurizer for the alcohols and as a primary, separately supplied fuel for continued catalytic combustion after spontaneous ignition with a lower alcohol-fuel mixture as described under the heading Multiple Fuel Containers. Thus the preferred fuels for use in the present apparatus and method comprise not only ethers with less than four carbon atoms including dimethyl and methyl ethyl ether, but also the lower alkane and alkene hydrocarbons with a boiling point below nominal room temperature including methane, ethane, propane including cyclo propane, butane including n-butane and isobutane, ethylene, propylene, butene-1 and -2, butadiene and butylene including isobutylene.

As a pressurizing constituent of the lower alcohol starting mixture the lower hydrocarbons mentioned may comprise as little as 5% of the fuel mixture with 95% of the mixture rich in alcohol. As previously noted the alcohol may be as low as 5% by volume, but higher concentrations approaching 95% by volume are preferred because catalytic combustion will start spontaneously more rapidly and reliably, particularly in humid weather, if the starting fuel is rich in alcohol. A mixture of 60% methanol and 40% isobutane, for example, affords reliable starting in ambients of 90% relative humidity, and at temperatures below 40° F.

Other advantages of using the lower hydrocarbons as a pressurizer for the alcohol are that they are readily available at low cost and are accepted as safe for personal use for example in cigarette lighters. The lower hydrocarbons are quite compatible with the plastic lining material commonly used in pressurized dispensing containers. They do not form formaldehyde on combustion, have a low latent heat of vaporization relative to the lower ethers, and a substantially higher heat value.

When the ignition starting alcohol mixture and a prinary fuel supplied simultaneously with or after ignition are in separate containers the starting mixture can be richer in alcohol and quicker and more reliable for spontaneous catalytic ignition if one of the lower hydrocarbons is used as a pressurizer, and the primary fuel for continued combustion after ignition need contain no alcohol and therefore will maintain its pressure until all liquid is expended.

Catalytic combustion apparatus using lower hydrocarbons as a pressurizer and a primary fuel is described hereinafter under the caption Multiple Fuel Containers—FIG. 7.

Catalysts—FIGS. 2 and 3

A platinum family catalyst is necessary for spontaneous ignition of a hydrocarbon fuel. The platinum family includes the platinum group of metals platinum, iridium and osmium, and the palladium group of palladium, ruthenium and rhodium. Preferably the platinum family catalyst is supported on a catalytically active porous body composed of one or more of the porous forms of the group alumina, silica, zirconia, thoria and molecular sieves. The porous catalytic supports are relatively inexpensive whereas platinum family metals are very expensive. Therefore, catalytic bodies have very little platinum family metal. Porous catalytic pellets with a platinum content of approximately 0.05 to 0.2% by volume are used in industrial processes which are brought to combustion temperature but which cannot initiate spontaneous ignition. Similarly the above named porous bodies cannot alone initiate spontaneous combustion, and are, moreover, powerful adsorbers of atmospheric moisture and fuel at ordinary temperatures. For example, a bed of 0.1% platinum black supported on the surface of small ($\frac{1}{8}$ inch) spherical pellets of highly porous gamma alumina, after several hours of exposure in a combustion chamber to air of normal humidity, will not catalyse the oxidation of an air-methanol fuel at room temperature. Nor will such a catalytic body initiate spontaneous combustion of liquid or vapor phase fuel mixture of 5% to 25% methanol in dimethyl ether.

I have found that the ignition inhibiting effect of adsorbed moisture is overcome by substantially increasing the platinum family content of the porous catalytic body to at least approximately 2% and in a range up to 60% of the initial weight of the porous body.

Below approximately 2% spontaneous ignition does not occur. Above 60% the time for combustion to start increases markedly. Within the range of 2% to 60% platinum, a platinum content of 18% to 50% of the initial porous body weight assures the fastest starting of spontaneous ignition.

Catalytic bodies with such a high platinum family content are, of course, relatively costly but I have further found that only a small proportion of the catalyst bed 10 within the combustion chamber 27 need consist of the enriched or highly concentrated 2% to 60% platinum family bodies 10A, symbolized by cross hatched areas in FIG. 2, and that less costly platinized porous bodies 10B with under 2% platinum family concentration symbolized by shaded areas in FIG. 2, and unplantinized porous bodies symbolized by unshaded areas in FIG. 2, may be used as the major portion of the catalytic mass 10.

The preferred form of enriched catalytic pellet is a porous support of gamma alumina with 2% to 60% platinum black or palladium superficially dispersed in the alumina as shown in FIG. 3.

The lower (under 2%) platinum family concentration bodies 10B may consist of platinum applied to the surface of gamma alumina pellets.

The unplatinized catalytic pellets 10C are preferably porous gamma alumina.

As described in more detail under the caption Lather Heater—FIG. 4 the bodies 10A of high catalytic concentration are disposed at the fuel inlet 22 to the combustion chamber 1 where they will initiate spontaneous combustion despite the fuel refrigeration effect and the presence of adsorbed moisture.

Starter pellets 10A, although exposed to humid air for days will ignite catalytic combustion within a few seconds when exposed to methanol. Combustion will then dry and spread through the bed to less enriched pellets.

Fuel Flow Rate—FIG. 6

A precaution should be taken with catalytic apparatus to avoid unwanted and toxic products of combustion such as the aldehydes corresponding to the alcohols and ethers in the fuel, for example formaldehyde. Formaldehyde can be detected by its odor when present in nontoxic quantities of a few parts per million and therefore detection by odor is a practical and safe test. Above a barely discernable odor formaldehyde is very irritating to the eyes and nose. If formaldehyde formation is avoided other toxic or irritating oxidization products such as carbon monoxide, ethers or organic acids are also avoided.

I have found that such unwanted products of combustion are avoided if the dimensions of the apparatus are selected such that one or both of two parameters called Heating Intensity and Fuel Mass Flow Rate are kept within critical limits. These parameters are defined as follows:

Heating Intensity is the heating power absorbed by the heat exchanger, divided by the volume of the space occupied by the catalyst. Convenient units in which to express Heating Intensity are [calories/(sec×cm$^3$)].

Fuel Mass Flow Rate is flow rate of the fuel vapor, divided by the cross section of the catalyst bed through which it flows. Convenient units are [grams/(sec×cm$^2$)].

In FIG. 6 Fuel Mass Flow Rate is compared to Heating Intensity with respect to formaldehyde formation during catalytic combustion. Outside the shaded area substantial amounts of formaldehyde can be detected by odor when Heating Intensity exceeds 4.5 cal/(sec×cm$^3$) or when Fuel Mass flow rate exceeds 0.0025 gms/(sec×cm$^2$). Within the shaded area formaldehyde is not formed in detectable amount.

It is, of course, necessary to provide sufficient heat transfer surface such that conventional surface heat transfer coefficients are not exceeded on either the catalyst side or the fluid side of the heat exchanger (e.g. coiled tubing 6 in FIG. 1), and that the correct ratio of fuel vapor and air is maintained for optimum oxidization. Typical dimensions affording the two parameters, are given in the description of Lather Heater—FIG. 4 and Stove—FIG. 5. For complete combustion of methanol—dimethyl ether fuel from the vapor phase of the container 11 of FIG. 1 the aspirator 27 should entrain about fifteen volumes of air to one volume of fuel vapor. An excess of air may produce formaldehyde and results in excessive heat loss in the exhaust.

Lather Heater—FIG. 4

The present catalytic combustion apparatus being compact and requiring a small fuel supply is particularly practical for heating, at daily intervals for example, of personal care media or products such as shaving lather and skin creams which have enhanced effect when hot. Such devices must necessarily be reliable, safe and quick to heat the fluid product, i.e. in a few seconds. The fuel should be easily replaceable.

Shown in FIG. 4 is a hot shaving lather dispenser 40 embodying the fuel supply and combustion chamber of the fluid heater of FIG. 1. A housing 41 of transparent plastic material encloses and supports a metal combustion chamber 1, fuel container 11 and aspirator 27 like those described with respect to FIG. 1 except that the heat exchange coil 6* is a double concentric helix. The coil 6* has an entrance at 7 outer turns winding downwardly toward the screen 4 chamber outlet 3, whence its inner turns wind upward to the outlet 8. The coil may be aluminum tubing with an outside diameter of 0.3175 cm. and an inside diameter of 0.254 cm., the outer turns being 2.857 cm. and the inner turns being 1.588 cm. in outer diameter. The double helix coil is tightly wound and with the turns close to or in contact with each other. Closely wound turns, preferably bonded together will serve to confine the catalyst mass 10 between the inlet and outlet screens 4 without the external chamber wall 1.

Spacers 42 extending inwardly from the housing 41 slidingly confine and insulate the combustion chamber 1 which rests on a leaf spring 43 yieldingly holding the chamber in the upper position shown. The aspirator 27 is rigidly attached to the chamber by a flange 44 crimped over a flange at the top of the chamber. The nozzle 20* fixed to the top of the aspirator comprises a plunger sliding in a collar 46 formed by the housing 41. Depressing the nozzle-plunger 20* slides the aspirator—chamber assembly downward against the spring 43. The entrance tube 7 of the coil 6* extends downwardly to a flare 47 receiving the stem valve 48 of an aerosol dispenser 49 of shaving lather or other personal care creamy fluid. The downward extension of the entrance tube 7 is sufficiently rigid to open the stem valve 48 when the aspirator—chamber assembly is depressed by the plunger 20*, thereby releasing shave or other cream through the heat exchange coil 6* to its outlet 8 and then through a spout leading out of the housing 41. During flow through the heat exchange coil the cream is heated to a suitable degree by flameless catalytic combustion of fuel in the chamber.

Fuel is supplied to the chamber from a pressurized container 11. The fuel comprises 10% of a lower alcohol, preferably methanol, and 90% of a lower ether pressurizer-fuel, preferably dimethyl ether, the fuel mixture having a lower liquid phase volume and an upper vapor phase volume at approximately 3.5 Kg/cm$^2$ pressure above atmospheric. A predetermined amount of liquid fuel, e.g. 0.050 ml., is released by a metering stem valve 16* functionally equivalent to valve 16 of FIG. 1. A continuous flow of fuel in vapor phase is released by an upper valve 21* functionally equivalent to valve 21 of FIG. 1. The lower stem valve 16* communicates with the atomizer nozzle 26 through a passage 52 in the bottom wall of the housing 41 and a flexible plastic tube 53. The upper stem valve 21* communicates through a passage 54 in a button 56 telescoping over the stem valve 21*, and thence through a flexible plastic tube 57 to a filter 58 within the nozzle 20*. The pressurized fuel container 11 is replaceably and slidingly confined in a socket 59. Depressing the button 56 actuates both stem valves 16* and 21* approximately simultaneously, the container itself comprising a mechanical link between the two. However, the internal spring of the upper stem valve may be stronger than that of the lower to delay opening of the upper valve 21* a fraction of a second after opening of the lower stem valve 16*.

In use the button 56 is depressed opening the two valves 16* and 21*. Valve 16* delivers the methanol rich starting fuel droplets to the enriched pellets 10A at the inlet 2 to the combustion chamber causing spontaneous catalytic ignition. The button is held depressed for a few, e.g. 6, seconds until delivery of fuel vapor through the upper stem valve 21*, nozzle 20* and aspirator 27 spreads combustion through the catalyst bed 10. At the end of the combustion period a glow in the combustion chamber can be seen through the transparent housing 41, and the aspirator which may be made of heat resistant transparent plastic or may include a light pipe 30 transmitting the glow of the catalyst bed. The nozzle—plunger 20* is then depressed for about 6 seconds to deliver about 3 grams of hot cream to the spout 51 at about 80° C., the button being released about 2 seconds later.

In a lather heater of the type described the space occupied by catalyst pellets was 4.97 cm$^3$ with a section across the path of fuel flow of 2.61 cm$^2$. The starter catalyst 10A at and near the fuel inlet 2 consisted of 25 pellets of gamma alumina, each approximately 0.318 cm. in diameter, and superficially filled with platinum adding 40% to the initial weight of the gamma alumina. The balance of the catalyst space was filled with pellets 10B similar except that they had a low concentration of approximately 0.1% platinum by weight.

The aspirator 27 comprised a converging section 29 blending smoothly with a throat 31 of 0.318 cm. diameter, which in turn blended with a divergence 32 whose total angle of divergence was 10° and whose widest diameter was 2.22 cm.

The Fuel Mass Flow Rate was 0.0023 grams/-(sec$\times$cm$^2$) and the Heating Intensity was 3.8 cal./-(sec$\times$cm$^3$). The combustion products contained no formaldehyde detectable by odor.

Stove—FIG. 5

In addition to the heat exchange systems of FIGS. 1 and 4 the present combustion apparatus is quite useful and efficient in the form of the stove plate or space heater shown in FIG. 5., particularly in a confined space such as a boat cabin where extra precautions against fire and noxious fumes must be taken.

To reduce fire hazard a container 11* of alcohol (e.g. methanol) alone without a self-pressurizing additional fuel is pressurized as needed with air supplied by a hand pump 61. The container has a liquid phase volume 12 connected by a pipe 62 to a valve 64, and a vapor phase volume 13 connected by a pipe 63 to the valve. The valve body 66 has a holding space 67 for a predetermined amount of fuel vapor. In this case an alcohol rich vapor is effective to ignite spontaneous combustion when the valve body is turned 45° counter clockwise delivering the predetermined amount of alcohol vapor through a pipe 68 to an atomizer 69 also capable of converting liquid fuel into droplets. The valve body 66 also has an elbow shaped passage 71 which upon rotation of the body 90° more or less connects the liquid volume 12 and pipe 62 with a pipe 72 leading through a catalyst bed 73 and a second valve 82 to a jet nozzle 76 like nozzle 20 of FIG. 1. The liquid fuel is vaporized in passing through the ignited catalyst bed and entrains air in an aspirator 77. The aspirator leads to a folded combustion chamber formed by an upper, circular, metal hot plate 78, bottom and side insulating walls 79 and a metal partition wall 81. The plate and walls define a combustion path with a fuel inlet 2* thence running first outwardly then inwardly to an outlet 3*. Here the combustion path is folded over-and-under in a vertical plane, although it may be folded side-by-side in a horizontal plane. In either case the outlet is in thermal conductive relation through the metal partition wall 81 with the inlet where high heating intensity due to the high catalyst concentration pellets 10A provides heat transfer to the pellets at the outlet and affords more complete combustion and avoidance of formaldehyde formation. These advantages may be further promoted by disposing a few high catalyst concentration pellets 10A at the outlet 3* filling the remainder of the combustion path with low catalyst concentration pellets 10B and with platinized gamma alumina pellets 10C.

While the lower alcohols, particularly methanol, are safe and efficient fuels for portable or mobile stoves and heaters, the stove of FIG. 5 may be run on hydrocarbon fuels such as propane or natural gas if they are available. In FIG. 5 a gas main 83 also leads to the second valve 82. After ignition by alcohol from the container 11* the valve 82 may switch fuel supply from the container 11* to the gas main 83.

Multiple Fuel Containers—FIG. 7

The hot shaving lather dispenser 40* of FIG. 7 is identical in construction and operation with the dispenser 40 of FIG. 4 except that the socket 59* of FIG. 7 is adapted to receive two fuel containers 11A and 11B in place of the single container 11 of FIG. 4.

The lower fuel container 11A contains an ignition starting fuel mixture of a lower alcohol preferably with one or more lower alkanes or alkenes as pressurizer as described at the end of the section captioned Fuels. As much as 95% of the mixture may be alcohol which is supplied from the liquid mixture 12A occupying all but the top gaseous volume 13A within the container 11A. A predetermined amount of liquid alcohol rich fuel is released by a stem valve 16* like that of FIG. 4 and conducted through the tube 53 to an atomizing nozzle which forms and directs alcohol rich droplets on the starter catalyst pellets 10A at the fuel inlet 2 of the combustion chamber 1 thereby spontaneously initiating catalytic combustion.

The upper container 11B holds a pressurized fuel, preferably one of the lower ethers, alkanes or alkenes previously described. Its stem valve 21* engaged by the button 56 is opened continuously while the button is depressed whereas the stem valve 16* of the lower container 11A opens only momentarily. The upper valve 21* may open simultaneously with or shortly after the lower valve 16*, and is held open a few seconds or until a glow can be seen in the catalyst bed 10. The upper valve 21* releases vaporized fuel through a tube 57 to a metering nozzle 20* which directs a jet of fuel vapor.

Whereas a two-phase alcohol-ether fuel is advantageous in the single fuel container of FIG. 1, the alcohol-hydrocarbon starting mixture is lower container 11A and a hydrocarbon primary fuel in the separate upper container 11B of FIG. 7 have the advantages in the low cost and ready availability of accepted hydrocarbon fuels compatible with conventional plastic container linings. The lower alkane and alkene hydrocarbons do not form formaldehyde and as pressurizers allow a higher percentage of alcohol in the starting mixture and have high heating value both as a pressurizer in the lower container 11A and as a primary fuel in the upper container 11B.

It should be understood that the present disclosure is for the purpose of illustration only and that this invention includes all modifications and equivalents which fall within the scope of the appended claims.

I claim:

1. A fuel supply for spontaneous catalytic ignition on a platinum family catalyst, characterized by one or more pressure sustaining means containing a lower alcohol fuel plus at least one second fuel selected from the group consisting of alkanes and alkenes having less than 5 atoms or carbon, dimethyl ether and methyl ethyl ether, the supply comprising a gas volume filled predominantly with the second fuel and a liquid volume containing the major portion of the alcohol fuel, whereby the fuels may be selectively discharged from the containing means in liquid phase to initiate spontaneous combustion ignition on a platinum family catalyst or in gaseous phase for sustaining catalytic combustion.

2. A fuel supply according to claim 1 wherein the second fuel is selected from the group consisting of methane, ethane, propane including cyclo propane, butane including n-butane and isobutane, ethylene, propylene, butene-1 and -2, butadiene and butylene including isobutylene.

3. A fuel supply according to claim 1 wherein there is 5% to 95% alcohol by volume.

4. A fuel supply consisting essentially of 5% to 25% by volume of at least one lower alcohol selected from the group consisting of methanol, ethanol and isopropanol and a lower ether selected from the group consisting of dimethyl ether and methyl ethyl ether.

5. A fuel supply according to claim 4 wherein there is approximately 10% methanol by volume.

6. A fuel supply according to claim 4 wherein the fuel is confined in a container pressurized by the ether and containing fluid volumes in the liquid and the vapor phase.

7. A fuel supply according to claim 6 wherein the liquid phase is approximately 5% to 25% alcohol by volume.

8. A fuel supply according to claim 1 wherein the container has means for separately valving the liquid and vapor phases therefrom.

9. A fuel supply according to claim 8 wherein one of the valving means comprises metering means for releasing a predetermined volume of fuel on each opening thereof.

10. A fuel supply according to claim 8 wherein one of the valving means continuously releases fuel while open.

11. A fuel supply according to claim 1 characterized in that the container means comprises means to valve the alcohol separately from the second fuel.

12. A fuel supply according to claim 1 wherein the proportion of alcohol to the second fuel is sufficient to continue to provide liquid fuel for ignition and gaseous fuel for sustaining combustion as the fuel supply is substantially depleted.

* * * * *